(No Model.) 2 Sheets—Sheet 2.
J. HALL.
DRIFTING DEVICE FOR LATHES.
No. 320,652. Patented June 23, 1885.
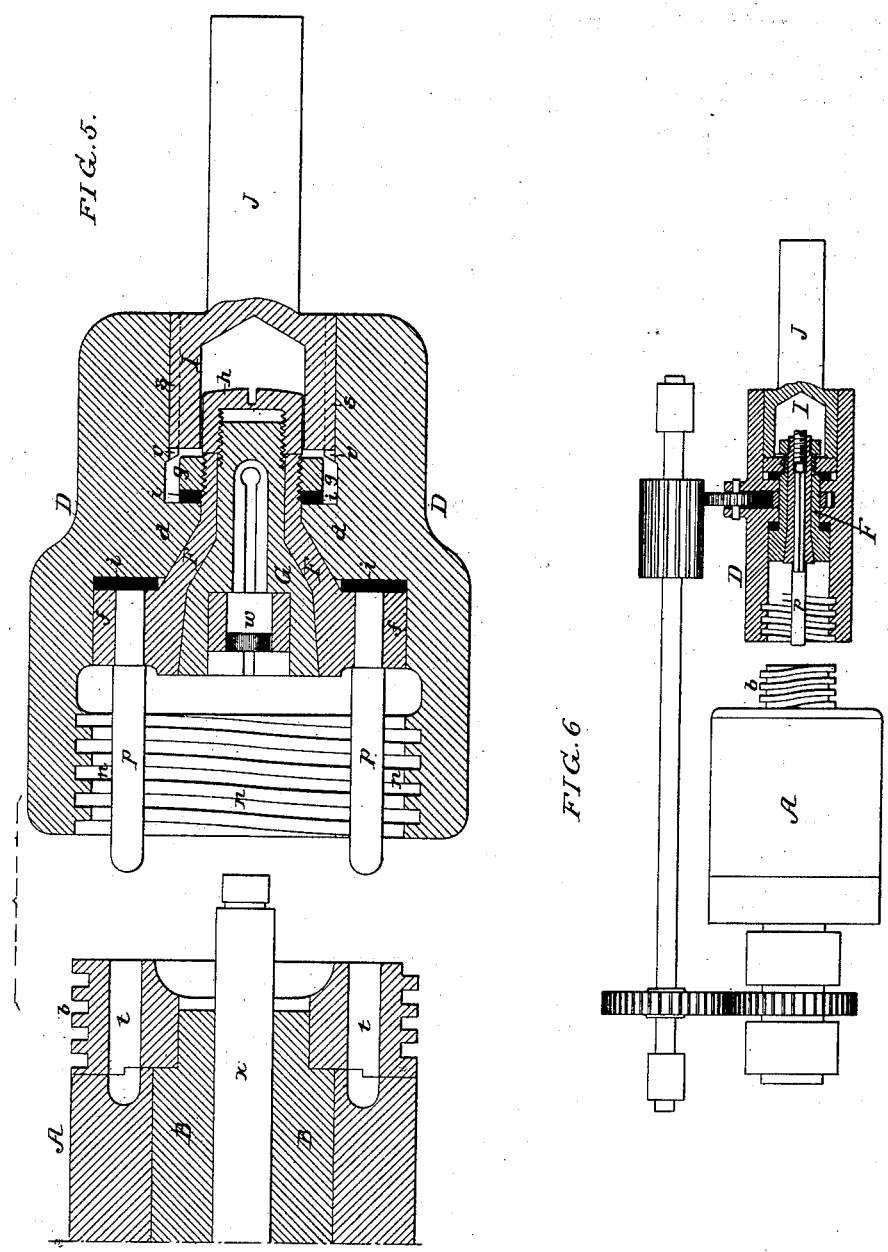
Witnesses:
John E. Parker
Harry Drury
Inventor:
John Hall
by his Attorneys
Howson & Son

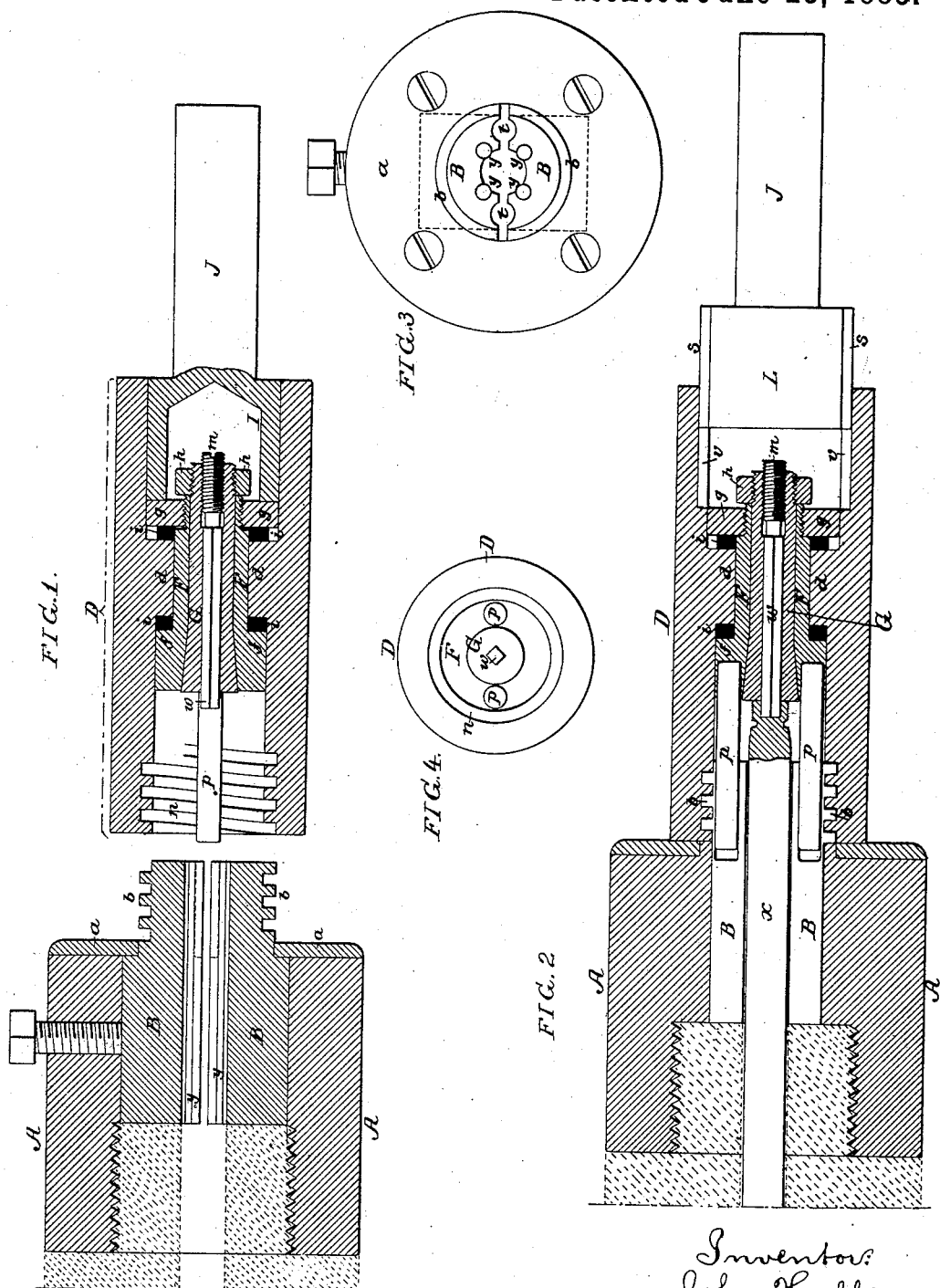

UNITED STATES PATENT OFFICE.

JOHN HALL, OF PHILADELPHIA, PENNSYLVANIA.

DRIFTING DEVICE FOR LATHES.

SPECIFICATION forming part of Letters Patent No. 320,652, dated June 23, 1885.

Application filed October 27, 1884. (No model.)

*To all whom it may concern:*

Be it known that I, JOHN HALL, a citizen of the United States, and a resident of Philadelphia, Pennsylvania, have invented a certain Improved Drifting Device for Lathes, of which the following is a specification.

The object of my invention is to effect the punching, cutting, or milling of metal objects without the use of the ordinary punching-press or milling-machine; and this object I attain in the manner hereinafter set forth, reference being had to the accompanying drawings, in which—

Figure 1, Sheet 1, is a longitudinal section of a device embodying my invention; Fig. 2, a sectional plan view of the same, illustrating the operation of the device; Fig. 3, a face view of the chuck; Fig. 4, a face view of the tool-carrier; Fig. 5, Sheet 2, a sectional view of another form of the device, and Fig. 6 a view illustrating a modification of part of the invention.

A represents a chuck secured to the end of the hollow mandrel of a lathe, as shown by dotted lines in Figs. 1 and 2, and having jaws B B for clamping the work, these jaws being of quadrangular shape, as shown by dotted lines in Fig. 3, so that they are compelled to turn with the chuck, and being longitudinally confined between the end of the lathe-mandrel and a cover-plate, a, on the chuck. Portions of the jaws project beyond the face of the chuck, and on these projecting portions is cut a screw-thread, b.

The work to be performed in the present instance is the formation of a square opening or recess in the end of a rod, x, which is clamped in the chuck A, and this operation is performed by a drifting-tool, w, of which D is the carrier, consisting of a tubular casing with an internal partition, d, to the central opening of which is fitted a sleeve, F. The front end of this sleeve has a shoulder, f, and the rear end is threaded for the reception of a nut, g, between which and the partition d intervenes a washer, i, a similar washer being interposed between the partition and the shoulder f, so that while the sleeve is confined longitudinally to the carrier D, it is free to turn independently thereof. The opening of the sleeve is tapered at the front end for the reception of the tapered portion of the core G, which clamps the drifting-tool w, the rear end of the said core being threaded for the reception of a nut, h, which bears against the rear end of the sleeve F and draws the core into the same, so as to compress its front end and confine the tool. The sleeve F, with its core G, thus forms a tool-holding chuck, free to turn in the carrier D.

The rear end of the core G has a set-screw, m, forming a rear bearing for the tool w, so that the latter can be set up as the desired projection of the same may demand.

The front end of the carrier D has an internal screw-thread, n, for adaptation to the thread b of the chuck, and from the front end of the sleeve F project two pins, p, which can enter openings t in the jaws of the chuck.

To the rear end of the carrier D is adapted the head I of a stem, J, which may be secured to the movable tail-stock of a lathe, or to the turret of an ordinary turret-lathe, so as to be incapable of revolving therein, the head I having opposite splines, s, adapted to grooves v in the carrier, so that the latter can slide but cannot turn on the head. The operation of the device is as follows: The lathe-mandrel and chuck being rotated, the tail-stock or turret is moved so as to bring the threaded end of the carrier D into engagement with the threaded projecting portion of the chuck, the pins P having previously entered the openings t. The result of this will be the turning of the tool-holding chuck F G within the carrier D, and the drawing forward of the latter with a force and at a rate of speed depending upon the pitch of the screw-threads and the speed of the chuck A. This forward movement continues until the tool w has formed the recess in the end of the rod x, as shown in Fig. 2. (It should be understood that the end of the rod had been previously bored for the reception of the tool, the depth of the bore being so much in excess of the penetration of the tool as to provide for the reception of the curls or shavings formed by the action of the tool.) The movement of the chuck A is then reversed, and the tool-carrier D backed off.

Owing to the longitudinal strain on the work, due to the punching operation, it is important that the chuck A should have a firm hold upon said work; hence I provide the jaws B of the chuck with longitudinal bearing-surfaces of hardened steel, these bearings being formed by first drilling longitudinal openings in the jaws and then driving hardened steel pins $y$ into these openings, the latter being so located that the peripheries of the pins will project slightly beyond the inner faces of the jaws. By this means I provide hardened steel bearings extending the entire length of the jaws and presenting absolutely true bearings throughout, thus overcoming the objections due to hardened jaws, which are liable to become warped or distorted during the hardening operation, so that they fail to provide true gripping-surfaces. The inwardly-projecting portions of the pins $y$ form indentations in the work, which is thus practically keyed to and compelled to rotate with the chuck.

The device shown in Fig. 5 is substantially similar to that just described, the main point of difference being that the drifting-tool is constructed to form a toothed or milled surface on the outside of a rod or bar, $x$, instead of drifting a recess in the end of the same; and it should be understood that tools of various kinds may be used as demanded by the character of the work to be performed.

Where the work to be done is light, and it is desired to effect the movement of the carrier D wholly by the tail-stock or turret, the screw-threads $b$ and $n$ may be dispensed with; nor is it absolutely necessary to the carrying out of my invention that the chuck of the drifting-tool should be rotated by the engagement of pins on said chuck with openings in the chuck A, as the sleeve F may, if desired, be driven by gearing from the lathe-mandrel, so as to rotate at the same speed as said mandrel, (see Fig. 6;) or, if the engagement of the drifting-tool with the work is relied upon to cause the turning of said tool and its chuck, all outside means of rotating the latter will be dispensed with. The construction shown in Figs. 1 to 5 is, however, preferred in all cases.

I claim as my invention—

1. The combination of a chuck, A, a tool-carrier, D, movable from and toward said chuck, a drifting-tool, $w$, and a chuck therefor capable of rotating in the tool-carrier, as set forth.

2. The combination of a chuck, A, a tool-carrier, D, movable from and toward the same, a drifting-tool, $w$, a chuck therefor, free to turn in the carrier, and mechanism, substantially as described, whereby said chuck is caused to turn in unison with the chuck A, as specified.

3. The combination of the chuck A, having openings $t$, the tool-carrier D, movable from and toward the chuck, the drifting-tool $w$, and a chuck for the latter free to turn in the carrier, and having projecting pins $p$, adapted to enter the openings $t$ in the chuck A, as set forth.

4. The combination of the chuck A, having a screw-threaded projection, $b$, the tool-carrier D, having a screw-thread, $n$, adapted to that of the chuck, a drifting-tool, $w$, and a chuck therefor free to turn in the carrier, as set forth.

5. The combination of a rotating chuck, A, with the hardened steel pins $y$, contained in but projecting from longitudinal openings in the jaws of the chuck, and having a keying effect upon the work held in the chuck, as set forth.

In testimony whereof I have signed my name to this specification in the presence of two subscribing witnesses.

JOHN HALL.

Witnesses:
JOHN M. CLAYTON,
HARRY SMITH.